J. VIERLING.
VENDING MACHINE.
APPLICATION FILED NOV. 3, 1908.

929,733.

Patented Aug. 3, 1909.
6 SHEETS—SHEET 1.

Witnesses
H.H.Hahsag
K.H.Butler

Inventor
J. VIERLING,
By H.C.Evert & Co.
Attorneys

J. VIERLING.
VENDING MACHINE.
APPLICATION FILED NOV. 3, 1908.

929,733.

Patented Aug. 3, 1909.
6 SHEETS—SHEET 3.

Witnesses
A. H. Robsag
K. H. Butler

Inventor
J. VIERLING,
By H. C. Everts
Attorneys

J. VIERLING.
VENDING MACHINE.
APPLICATION FILED NOV. 3, 1908.

929,733.

Patented Aug. 3, 1909.
6 SHEETS—SHEET 6.

Witnesses
A. H. Rabsag,
Rex Butler

Inventor
J. VIERLING,

By H. C. Evert
Attorneys

UNITED STATES PATENT OFFICE.

JOSEPH VIERLING, OF PITTSBURG, PENNSYLVANIA.

VENDING-MACHINE.

No. 929,733.  Specification of Letters Patent.  Patented Aug. 3, 1909.

Application filed November 3, 1908. Serial No. 460,951.

*To all whom it may concern:*

Be it known that I, JOSEPH VIERLING, a citizen of the United States of America, residing at Pittsburg, in the county of Allegheny and State of Pennsylvania, have invented certain new and useful Improvements in Vending-Machines, of which the following is a specification, reference being had therein to the accompanying drawing.
This invention relates to vending machines, and the object of my invention is to provide a novel machine for dispensing small articles, packages or periodicals.
  Another object of my invention is the provision of positive means in connection with a vending machine for insuring the delivery of an article upon depositing the coin within the machine, or the return of the coin should the machine be partly or completely exhausted.
  A further object of my invention is to provide a vending machine that can be used for advertising purposes and located in conspicuous places.
A still further object of my invention is to provide a novel coin controlled mechanism for vending machines wherein reliable means is employed for returning a coin should the machine not be in condition for using the same.
  A still further object of my invention is to provide a novel pendulum controlled detent for coin controlled mechanisms.
  A still further object of this invention is to provide a manually actuated vending machine having a movable article holder controlling an electrical circuit employed for actuating the detent which governs the return delivery of a coin.
With the above and other objects in view which will more readily appear as the invention is better understood, the same consists in the novel construction, combination and arrangement of parts to be presently described and then specifically claimed.
  In the drawings.

To put my invention into practice, I provide the upper end of the pedestal 1 with a spider support 2 to which a horizontal circular base 3 is secured by bolts 4. Mounted centrally of the circular base 3 is a C-shaped bracket 5, and secured to this bracket by rivets 6 is a circular platform 7 of a less diameter than the base 3. The platform 7 is provided with circumferentially arranged tracks 8, 9 and 10, said tracks being intersected by a radially disposed slot 11 formed in the platform 7. This slot 11 vertically alines with a similar slot 12 formed in the base 3, and mounted upon said base and extending upwardly directly beneath the slot 11 is an oblong chute 13. One side of this chute is slotted, as at 14, and provided with exterior end brackets 15, said brackets limiting the upward movement of a spring-pressed gate 16 hinged at the upper edge of the slot 14, as at 17. The gate 16 is adapted to normally close the chute 13, and swings into the slot 14 when an article passes through the chute.

The base 3 is provided with a depending delivery cage 18 below the slot 12, said delivery cage having the forward end thereof open, as at 19, whereby an article deposited in the cage can be readily removed.

Mounted in the C-shaped bracket 5 is a bearing 20 for the lower end of a vertical shaft 21, which is pivoted in said bracket and extends upwardly through the stationary platform 7. The shaft 21 above the platform 7 is provided with two circular heads 23, and mounted in the peripheral edges of said heads are radially disposed article holders, each holder comprising two parallel plates 23 having their lower edges slotted, as at 24, to provide clearance for the tracks 8, 9 and 10. The plates 23 of one holder are connected to the plates of adjoining holders by U-shaped frames 25, these frames being grooved as at 26, to receive plates 27 used for advertisement purposes.

Articles are supported between the plates 23 of each holder and rest upon the tracks 8, 9 and 10, the articles being gradually carried around upon the tracks until directly above the slot 11, chute 13, slot 12, and cage 18, when the article between the plates descends through said slot and chute into the cage 18.

To move the article holder, I provide the vertical shaft 21 in the C-shaped bracket 5 with a ratchet wheel 28, said ratchet wheel upon one side being engaged by a spring-pressed pawl 29, carried by the C-shaped bracket 5. The spring-pressed pawl 29 is employed to prevent a rearward rotation of the ratchet wheel 28. The opposite side of the ratchet wheel 28 is engaged by a pivoted spring-pressed pawl 30 carried by the end of a two-part plunger forming a part of the coin controlling mechanism. This two-part plunger comprises two rods 31 and 32, rectangular in cross section and fitting upon the longitudinal shoulders 33 of a casing 34. The confronting ends of the rods 31 and 32 are beveled, as at 35, and are provided with side pins 36 and 37 protruding through the oppositely disposed slots 38 and 39 respectively, formed in the sides of the casing 34. One of the pins 36 is connected by a retractile spring 40 to a projection 41 carried by the forward end of the casing 34, while one of the pins 37 is connected by a retractile spring 42 to another projection 43 carried by the casing 34. These springs are located upon opposite sides of the casing, whereby said springs will be free to independently act to maintain the plunger rods 31 and 32 in proper relation to each other.

The casing 34 is supported in a horizontal position by a coin chute 44 having an inclined bottom 45 for guiding coins into a tray 46 detachably mounted upon the circular base 3 between cleats 47 secured to said base. The coin chute 44 is in turn supported by a coin delivery chute 48 extending through the base 3 and downwardly at an inclination to a hanger 49 carried at the edge of the base 3, said chute 48 terminating in a cup 50 from which a coin can be easily removed.

The casing 34 is provided with a longitudinal coin groove 51 communicating with the chute 44 by a slot 52. In the coin groove 51 is mounted a flat spring 53 which is adapted to retain a coin in position for action after said coin once assumes a certain position in the groove 51, the coin being placed in this position by the plunger rods 31 and 32, as will presently appear.

Secured upon the casing 34 by screws 54 is a cover plate 55, said cover plate having a longitudinal slot 56 formed therein alining vertically with the coin groove 51. Secured to the cover plate 55, by screws 57 is an inlet coin chute 58, said chute being supported at the forward end thereof by a hanger 59 carried by the stationary platform 7.

The C-shaped bracket 5 is provided with an extension 60 and pivotally connected to the forward end of said extension, as at 61, is an operating lever 62 having a curved crank 63 for engaging a roller 64, journaled upon the forward end of the plunger rod 32. The crank 63 is connected by a coil spring 65 to a depending hook 66 carried by the stationary platform 7.

Figures 1, 12:
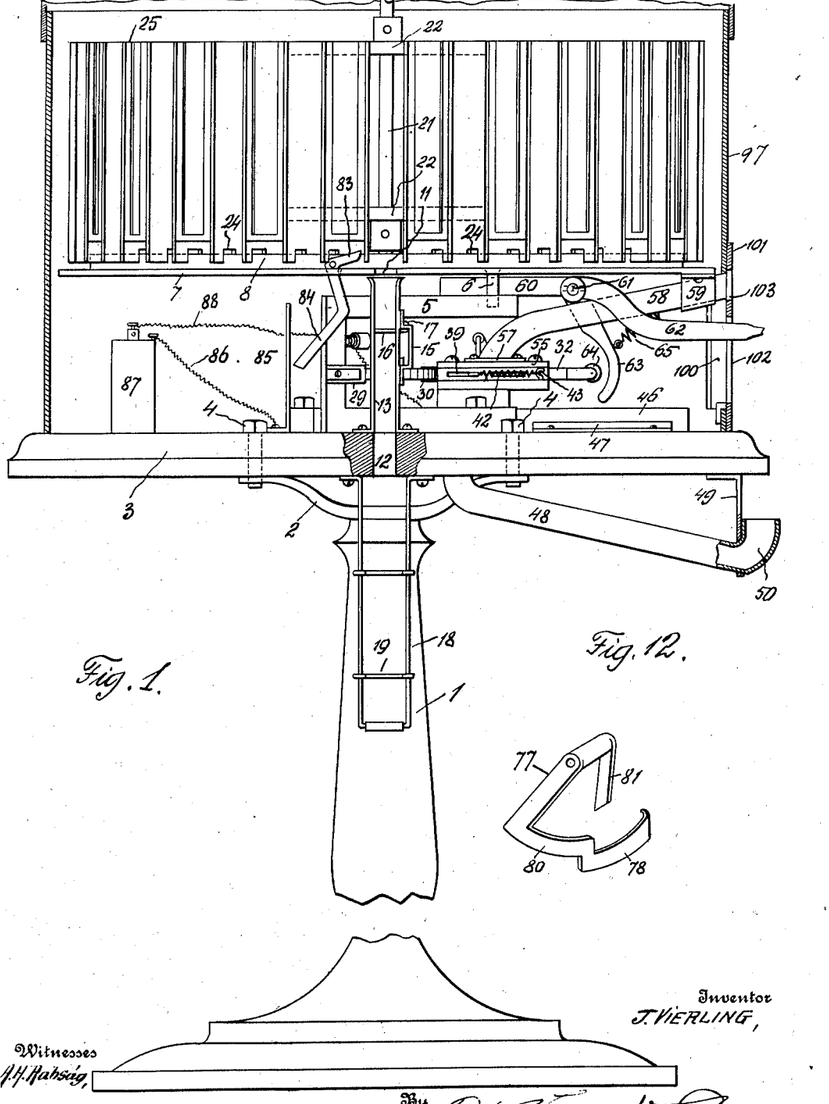
—Figure 1 is a side elevation of my machine partly broken away and partly in section.
Fig. 12 is a perspective view of a pendulum forming part of the electrical coin controlling device.
Figures 2, 3, 4, 5, 6:
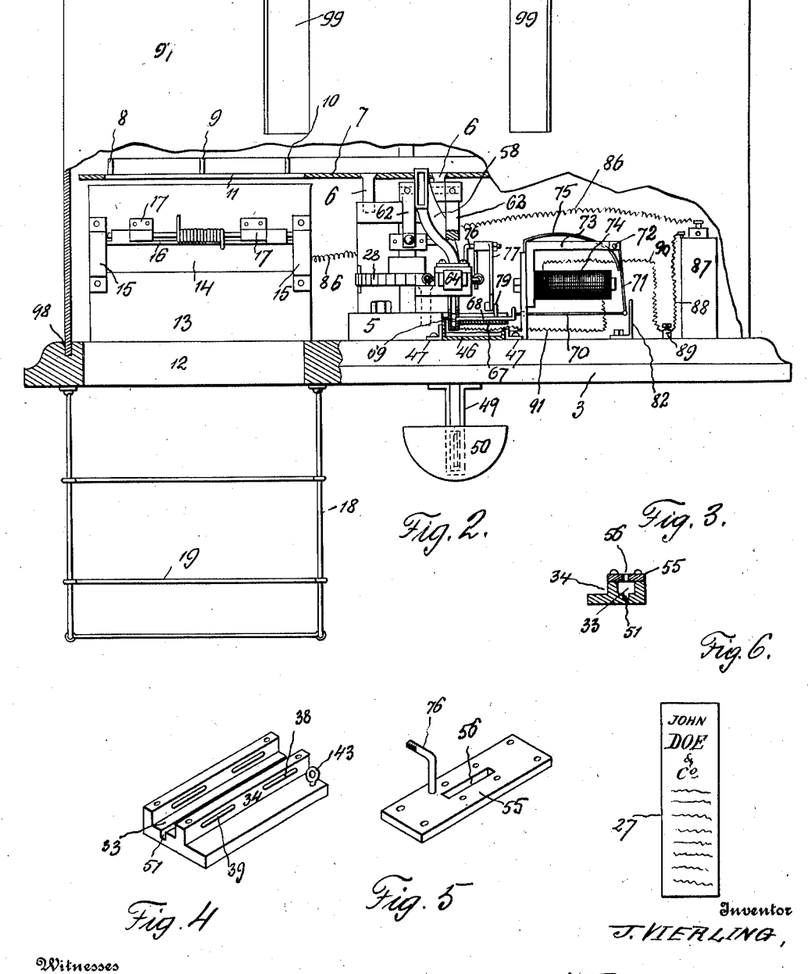
Fig. 2 is a front elevation of a portion of the machine, partly broken away and partly in section.
Fig. 3 is a cross section of a portion of the coin controlling mechanism.
Fig. 4 is a perspective view of a coin controlling casing.
Fig. 5 is a similar view of a cover plate of said coin controlling casing.
Fig. 6 is an elevation of an advertisement card or plate used in connection with the machine.
Figures 7, 8:
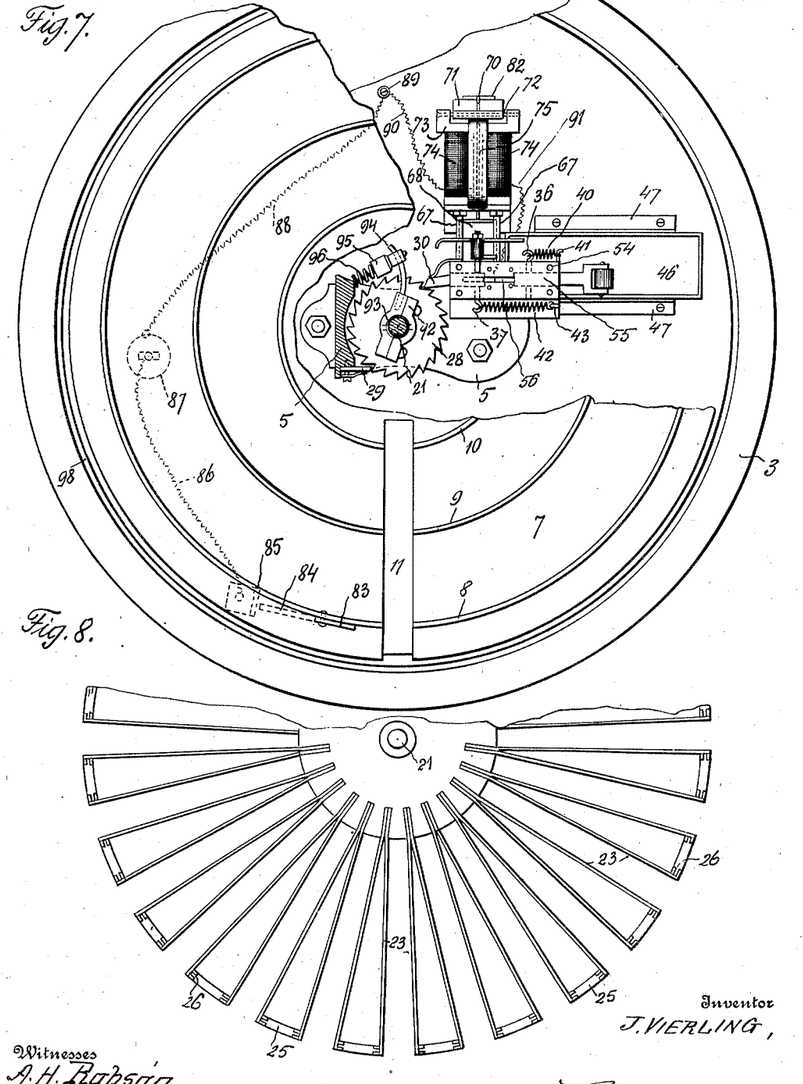
Fig. 7 is a plan of the machine partly broken away and partly in section, with the casing thereof removed.
Fig. 8 is a plan of a portion of a movable article and advertisement holder.
Figure 9:
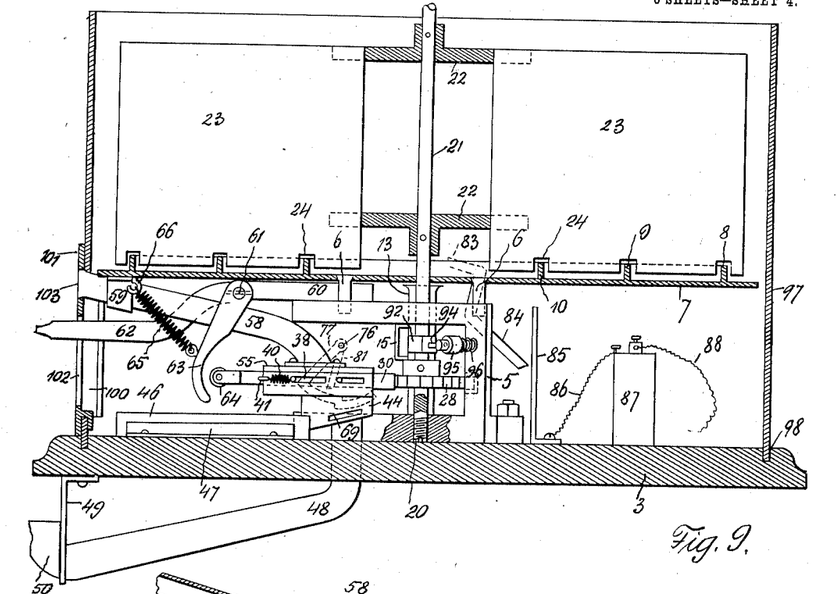
Fig. 9 is a cross sectional view of a portion of the machine.

In connection with the coin controlling mechanism, I use an electrically actuated detent for controlling the passage of the coin into the chute 48 or into the tray 46, the operation of said detent being governed by a pendulum associated with the coin controlling mechanism. Contiguous to the coin chute 44 is arranged a channel guide 67 for a detent 68 adapted to enter a slot 69 formed in the coin chute 44, said detent 68 controlling the passage of coin into the outlet chute 48. The detent 68 is provided with a rearwardly extending rod 70 which is pivotally connected to the lower end of the armature 71, pivotally connected as at 72 to a frame 73, carried by the base 3. The frame 73 supports an electro-magnet 74, which when energized is adapted to attract the armature 71 and move the detent 68 into the coin chute 44. The armature 71 is normally held out of engagement with the electro-magnet by a flat spring 75 secured to the frame 73, as best shown in Fig. 2 of the drawings, and the outward movement of said armature, and consequently the detent 68 is limited by a post 82 mounted upon the base 3 of the machine.

Figures 14, 16:
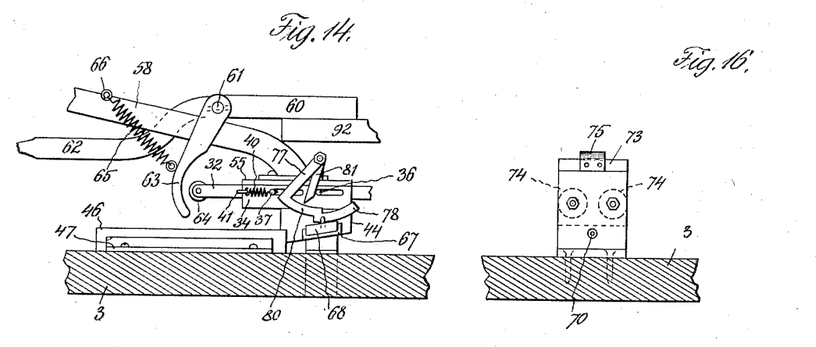
Fig. 14 is an elevation of a portion of the coin controlling mechanism, illustrating the pendulum controlled detent in a locked position.
Fig. 16 is an end view of an electro-magnet used in connection with the machine.
Figures 15, 17:
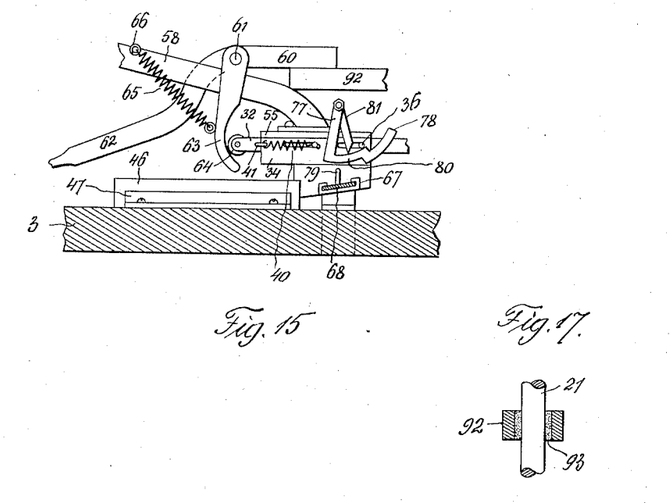
Fig. 15 is a similar view illustrating the detent as released by the pendulum.
Fig. 17 is a horizontal sectional view of a tension device forming part of the machine.

To lock the detent 68 and prevent the same from entering the coin chute 44, the cover plate 55 of the coin controlled casing 34 is provided with a bracket 76, from which is suspended a pendulum 77. This pendulum conforms to a sector having an edge 78 for engaging a pin 79 extending upwardly from the detent 68, said edge being cut away, as at 80, to provide clearance for the pin, when the pendulum 77 assumes its normal position by gravity. The pendulum 77 is held in an abnormal position (see Fig. 14) by an arm 81 carried by said pendulum engaging one of the pins 37, this abnormal position of the pendulum preventing the detent 68 from entering the chute 44, consequently a coin in the groove 51 of the casing 34 can descend through the slot 52 and pass directly through the chute 44 into the coin delivery chute 48. This movement of the coin takes place when the machine or one of the article holders thereof is exhausted, as will hereinafter appear, and when an article is delivered the movement of the coin in the chute 44 is interrupted by the detent whereby the coin will be deflected into the tray 46. This is accomplished by the pendulum 77 assuming its normal position by gravity, as shown in Fig. 15, allowing the cut away portion 80 of the pendulum 178 to provide clearance for the pin 79 of the detent 68, whereby the energization of the electro-magnet will immediately project the the detent 68 into the chute 44.

Pivotally connected to the track 8 adjacent to the chute 13 is a bell crank lever having the shorter arm 83 thereof extending above said track, while the longer arm 84 is adapted to contact with a post 85 carried by the base 3. The post 85 is connected by a wire 86 to a suitable source of electrical energy, as a battery 87, and said battery is connected by a wire 88 to a binding post 89, and by a wire 90 to the electro-magnet 74. The electro-magnet 74 is connected by a wire 91 to the coin chute 44, where the circuit is grounded or completed through the metallic structure of the vending machine.

In connection with the vertical shaft 21 I use a tension device, said tension device being located above the ratchet wheel 28. This device comprises a clamp 92 loosely mounted upon the shaft 21, the clamp being provided with a leather bushing 93, for frictionally engaging the shaft 21, as best shown in Fig. 17 of the drawings. The clamp 92 is connected by a curved arm 94 to a block 95 mounted upon the end of a coil spring 96, this spring bearing against the bracket 5, and is resisted thereby when pressure is brought to bear upon said spring. This tension device prevents the shaft 21 from freely rotating after having received an impulse by the spring-pressed pawl 30. An impulse from the pawl 30 simply moves the ratchet wheel 28 the distance of one tooth, and the tension device prevents the wheel 28 from moving the distance of two teeth, while the spring-pressed pawl 29 prevents a rearward rotation of the wheel 28.

Inclosing the mechanism of my machine is a cylindrical metallic casing 97 that can be of an ornamental design. This casing is adapted to fit in the annular groove 98 formed in the base 3, and is provided with vertical openings 99, whereby the advertisement cards or plates 27 carried by the article holder can be observed. The openings 99 are located upon the front side of the machine, but in some instances can be arranged circumferentially of the casing 97, whereby the advertisements can be observed from all sides of the machine. The casing 97 is provided with a door-way 100 and detachably mounted in front of this door-way is a door 101 having a slot 102 providing clearance for the operating lever 62. The door 101 is provided with another opening 103 registering with the open end of the inlet coin chute 58. A suitable lock can be used for securing the door 101 to the casing 97. The casing 97 is provided with a detachable lid or cover 104, and this lid or cover can be removed when it is desired to re-charge the machine or place articles in the movable holder thereof.

Figure 10:
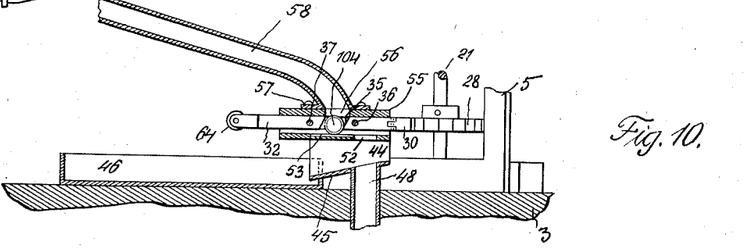
Fig. 10 is a vertical sectional view of the coin controlling mechanism of the machine in an inactive position.
Figure 11:
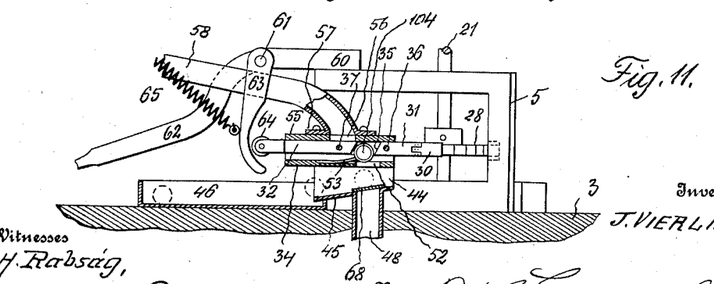
Fig. 11 is a similar view of the same in an active position.
Figure 13:
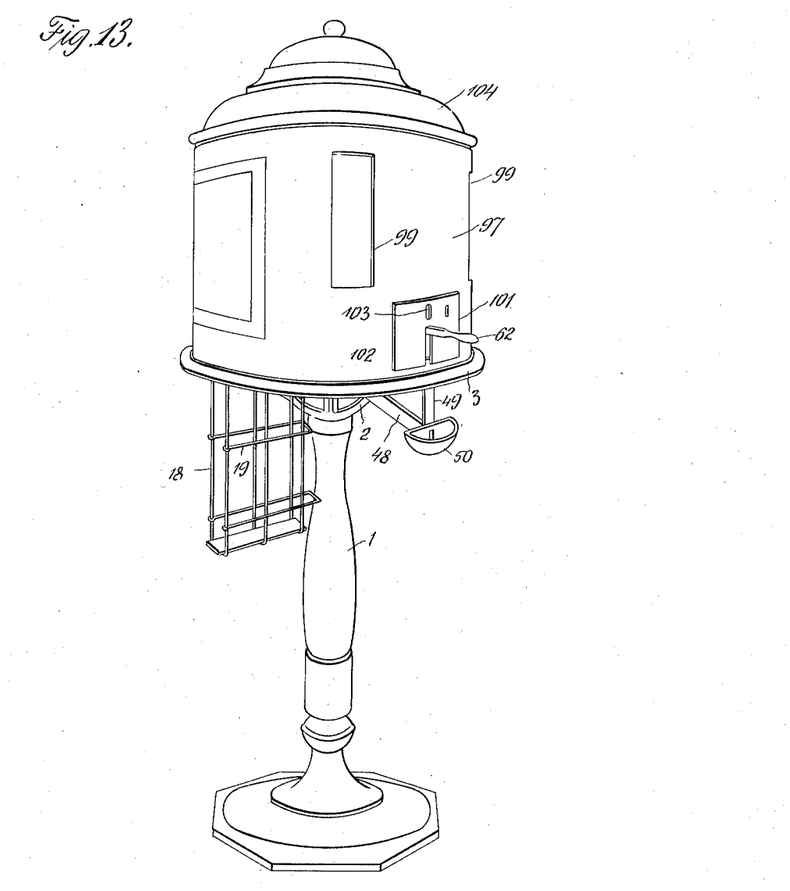
Fig. 13 is a perspective view of my machine.

Operation: Assuming now that the machine is in condition for operation, and that the coin 104 has been deposited in the chute 58, the coin immediately descends into the casing 34 and rests in a vertical position in the groove 56. The coin 104 in this position, as shown in Fig. 10 of the drawings, completes the two-part plunger. When the operating lever 62 is depressed, the curved crank 63 thereof immediately impinges the roller 64 and forces the plunger rod 32 inwardly. Immediately upon the coin 104 riding over the spring 53, the coin cannot return beneath the slot 56, and a further inward movement of the plunger rod 32 forces the coin to descend into the coin chute 44. When the coin 104 is moved forward to the slot 52, the plunger rod 31 is also moved forward causing the spring-pressed pawl 30 to move the ratchet wheel 28. In consequence of this movement one of the holders will be moved directly above the slot 11, chute 13, slot 12 and cage 18, allowing the article contained therein to descend through said slots into the cage 18. Since the articles of said holders rest upon the tracks 8, 9 and 10, each article will impinge the short arm 83 of the bell crank lever, carried by the track 8, and cause the long arm 84 of said lever to contact with the post 85. An electrical circuit is immediately completed through the battery 87 that energizes the electro-magnet 74 and causes said magnet to attract the armature 71. This movement of the armature pushes the detent 68 into the coin chute 44 and closes the upper end of the coin chute 48, causing the coin 104 to pass into the tray 46. Should one of the holders be empty, the short arm 83 of the bell crank lever will not be affected by a movement of the revoluble holder, consequently no circuit will be established through the electro-magnet 74, and the detent 68 will remain out of the coin chute 44, allowing the coin 104 to pass straight through the chute 44 into the chute 48 from where the coin descends to the cup 50 and can be removed by the operator of the machine. In this manner all coin will be returned to the intended purchaser and can be again deposited if the article is still desired. The chute 48 normally remains open by virtue of the spring 75 pressing upon the armature 71 and holding the detent 68 out of the chute 44. The detent is locked in this position by the pendulum 77, until the pendulum is released by the two-part plunger of the coin controlling mechanism.

An important characteristic of my invention is the electrically actuated detent and the pendulum for controlling the movement of the same. Before the coin 104 is forced downwardly into the slot 52, the two-part plunger has had sufficient time to move the platform 7, and the actuation of the detent entirely depends on whether an article is in one of the holders. When the two-part plunger is moved to intermittently move the platform 7, the pendulum 77 is allowed to gradually assume its normal position by gravity and provide clearance for the pin 79, should an article in the holder establish a circuit to energize the electro-magnet 74 and move the detent into the chute 44. The movement of the detent 68 is almost instantaneous and is so regulated by the position of the contact arm 83, the duration of the electrical circuit simply being sufficient to retain the detent in the chute 44 to deflect the coin as the same is precipitated. It is apparent that the operating lever 62 can be actuated without effecting a movement of the pivoted pawl 30 when a coin is not deposited in the machine, consequently the pendulum 77 will be normally retained in the position shown in Fig. 14.

It is apparent that the springs 40 and 42 return the plunger rods 31 and 32 to their normal position, while the spring 65 returns the operating lever 62 to its normal position.

The character of the articles placed in the machine can be indicated upon the exterior of the casing 97, or an additional opening 99 can be provided whereby the article can be observed.

While in the drawings forming a part of this application there is illustrated the preferred embodiments of my invention, it is to be understood that the same can be varied or changed as to shape, proportion and manner of assemblage without departing from the spirit of the invention.

Having now described my invention what I claim as new, is:—

1. In a vending machine, the combination with a coin controlling mechanism including a coin controlled casing, a two-part plunger mounted in said casing, chutes for conveying the coin to and from said casing, and an operating lever for actuating the said two-part plunger, of a pedestal, a base carried by said pedestal for supporting said coin controlling mechanism, a C-shaped bracket mounted centrally of said base, a vertical shaft journaled in said bracket, a stationary platform supported by said bracket and surrounding said shaft, circular tracks carried by said platform, a plurality of radially disposed holders carried by said shaft and adapted to support articles upon said tracks, a ratchet wheel carried by said shaft, a pawl actuated by said two-part plunger for moving said ratchet wheel, a tension device carried by said bracket and engaging said shaft for preventing a free movement of said shaft, an electrically operated detent adapted to enter one of said chutes and deflect a coin to said base, means actuated by the movement of an article upon said tracks for controlling the operation of the electrically operated detent, and a casing inclosing said coin controlling mechanism and said holders, substantially as described.

2. In a vending machine, the combination with a coin controlling mechanism, a coin controlled casing, a two-part plunger mounted in said casing, chutes for conveying the coin to and from said casing, and an operating lever for actuating the said two-part plunger, of a pedestal, a base carried by said pedestal for supporting said coin controlling mechanism, a C-shaped bracket mounted centrally of said base, a vertical shaft journaled in said bracket, a stationary platform supported by said bracket and surrounding said shaft, circular tracks carried by said platform, a plurality of radially disposed holders carried by said shaft and adapted to support articles upon said tracks, a ratchet wheel carried by said shaft, a pawl actuated by said two-part plunger for moving said ratchet wheel, an electrically operated detent adapted to enter one of said chutes and deflect a coin to said base, means actuated by the movement of an article upon said tracks for controlling the operation of the electrically operated detent, and a casing inclosing said coin controlling mechanism and said holders.

3. In a vending machine, the combination with a coin controlling mechanism including a two-part plunger adapted to be completed by a coin and moved by an operating lever, of a base for supporting said coin controlling mechanism, a bracket carried by said base, a platform mounted upon said bracket, circular tracks carried by said platform, a vertical shaft journaled in said bracket and extending upwardly above said platform, a plurality of radially disposed holders carried by said shaft for supporting articles upon said tracks, a ratchet wheel carried by said shaft and adapted to be intermittently moved by said two-part plunger, a tension device carried by said bracket and engaging said shaft for retarding the movement of said shaft, and an electrically operated detent in connection with said coin mechanism and actuated by the movement of an article upon said tracks for retaining the coin in said machine.

4. In a vending machine, the combination with a coin controlling mechanism including a two-part plunger adapted to be completed by a coin and moved by an operating lever, of a base for supporting said coin controlling mechanism, a platform mounted upon said base, circular tracks carried by said platform, a vertical shaft journaled upon said base and extending through said platform, radially disposed holders carried by said shaft for moving articles upon said tracks, means actuated by said two-part plunger for intermittently moving said shaft, a tension device arranged between said base and said platform for preventing a free movement of said shaft, an electrically actuated detent in connection with said coin controlling mechanism and adapted to deflect a coin upon said base, means actuated by the movement of an article upon said tracks for controlling the actuation of said detent, and a casing inclosing said coin controlling mechanism and said holders.

5. In a vending machine, the combination with a coin controlling mechanism including a two-part plunger adapted to be completed by a coin and moved by an operating lever, of a base for supporting said coin controlling mechanism, a platform mounted upon said base, circular tracks carried by said platform, a vertical shaft journaled upon said base and extending through said platform, radially disposed holders carried by said shaft for moving articles upon said tracks, means actuated by said two-part plunger for intermittently moving said shaft, an electrically actuated detent in connection with said coin controlling mechanism and adapted to deflect a coin upon said base, means actuated by the movement of an article upon said tracks for controlling the actuation of said detent, and a casing inclosing said coin controlling mechanism and said holders.

6. In a vending machine, the combination with a coin controlling mechanism including a two-part plunger adapted to be completed by a coin and moved by an operating lever, of a base for supporting said coin controlling mechanism, a platform mounted upon said base, circular tracks carried by said platform, a vertical shaft journaled upon said base and extending through said platform, radially disposed holders carried by said shaft for moving articles upon said tracks, means actuated by said two-part plunger for intermittently moving said shaft, an electrically actuated detent in connection with said coin controlling mechanism and adapted to deflect a coin upon said base and means actuated by the movement of an article upon said tracks for controlling the actuation of said detent.

7. The combination with a coin controlling mechanism adapted to have a coin passed therethrough, of a base supporting said mechanism, a platform arranged above said base for supporting articles, revoluble holders arranged above said base and adapted to be intermittently moved through the medium of said coin controlling mechanism, an electrically actuated detent for controlling the passage of coin through said coin controlling mechanism, means actuated by the movement of an article upon said base for operating said detent, and a pendulum in connection with said coin controlling mechanism for controlling the operation of said detent.

8. The combination with a coin controlling mechanism adapted to have a coin passed therethrough, of a base, a revoluble article holder supported by said base and adapted to be intermittently moved through the medium of said coin controlling mechanism, and an electrically actuated detent associated with said coin controlling mechanism for deflecting a coin after passing through said mechanism, means actuated by the movement of an article in said holder for operating said detent, and a pendulum actuated by said coin controlling mechanism for governing the movement of said detent.

9. In a vending machine, the combination with a coin controlling mechanism, of an intermittently moving article holder actuated by said mechanism, an electrically actuated detent placed in operation by the movement of an article in said holder for deflecting a coin used in connection with said coin controlling mechanism, and means actuated by said coin controlling mechanism for governing the operation of said detent.

10. In a vending machine, the combination of a revoluble article holder adapted to be intermittently moved to deliver articles, means for moving said holder, said means comprising a ratchet wheel, and a plunger placed in an operable condition by a coin; and means governed by said holder and the articles carried thereby for controlling the disposal of the coin used in connection with the plunger.

In testimony whereof I affix my signature in the presence of two witnesses.

JOSEPH VIERLING.

Witnesses:
 MAX H. SROLOVITZ,
 JOHN R. STEPHENSON.